United States Patent [19]

Idjakiren

[11] Patent Number: 5,039,040
[45] Date of Patent: Aug. 13, 1991

[54] SNAP-FASTENER

[75] Inventor: Rachid Idjakiren, Beauchamp, France

[73] Assignee: ITW De France, Beauchamp, France

[21] Appl. No.: 536,916

[22] Filed: Jun. 12, 1990

[30] Foreign Application Priority Data

Jun. 13, 1989 [FR] France ................................ 89 07808

[51] Int. Cl.$^5$ .............................................. F16L 3/08
[52] U.S. Cl. ........................................ 248/73; 248/71;
248/742; 248/743; 24/453; 24/297
[58] Field of Search ............... 248/73, 71, 74.3, 74.2;
24/453, 297

[56] References Cited

U.S. PATENT DOCUMENTS

| 4,705,442 | 11/1987 | Fucci ................................ 24/453 X |
| 4,739,543 | 4/1985 | Harris, Jr. ............................ 24/297 |
| 4,856,051 | 8/1989 | Fujimoto ........................... 24/297 X |
| 4,875,647 | 10/1989 | Takagi et al. ...................... 248/743 |

Primary Examiner—Alvin C. Chin-Shue
Attorney, Agent, or Firm—Schwartz & Weinrieb

[57] ABSTRACT

A snap-fastener comprises an end plate (10) and a pair of resilient tangs (11A, 11B) extending from the plate and it so disposed that when each of the tangs bends it is displaced parallel to the arms (8, 9A, 9B).

11 Claims, 2 Drawing Sheets

SNAP-FASTENER

FIELD OF THE INVENTION

This invention relates to a snap-fastener for an element to be secured within a wall within which there is formed an opening, such as, for example, a cable clamp to or mounted upon be fixed to the wall of a car body.

BACKGROUND OF THE INVENTION

A snap-fastener of the foregoing type is already known, comprising an insertable body having a shape resembling that of a harpoon, with two resilient tangs extending upon both sides of the end of a central arm and having a natural position in which the free ends thereof are spaced from the arm and wherein they project outwardly beyond the contour of the opening, and wherein further they lie within this contour when they approach the arm.

The body is inserted by means of its end into the opening, the resilient tangs come closer to the central arm as they come into contact with the wall of the opening, and at the end of the insertion operation, when they have passed through the wall opening, they recover to their spread out expanded position, with their free ends disposed opposite to the wall against which they come to bear so as to prevent the removal of the insertable body.

This snap-fastener is generally entirely satisfactory, however, when it is required to reduce the bulk caused by means of the projection of the snap-fastener below the wall and to therefore diminish the volume of the insertable body, the snap-fastener requires a very high insertion force.

OBJECT OF THE INVENTION

This invention is directed toward a snap-fastener having a reduced bulk in connection with its projection beneath the wall, and which can be positioned with a low force exerted thereon.

SUMMARY OF THE INVENTION

To this end the invention proposes a snap-fastener comprising an insertable body having an arm and at least one resilient tang extending from the vicinity of one end of the arm and assuming a natural position at which its free end at least partly projects outwardly beyond the contour of the opening while it is also adapted to bend so as to lie entirely within the contour of the wall opening as the fastener passes through the wall opening, characterized in that it comprises an end plate joined transversely to the end of the arm and in that the resilient tang has its other end, opposite its free end, attached to the plate and is disposed so as to move parallel to the arm when it bends.

By moving parallel to the arm instead of coming closer to or being spaced therefrom, the tang during its movement is not limited by the presence of the arm and due to the resulting larger movement the tang can be disposed in a sufficiently inclined position so as to define a lever arm permitting it to bend under a low exertion force or load.

According to a preferred characteristic of the invention, the plate and the arm are adapted to the contour of the opening.

Insertion of the body into the opening is thus guided by means of the plate and then by means of the arm, and the resilient tang enters into contact with the edges of the opening only in within the vicinity of its free end, that is, only where there is provided a lever arm which is sufficiently strong.

According to further preferred characteristics of the invention the insertable body comprises a head fitting through the opening at the end of the insertion operation and the plate is connected to the head by means of two arms disposed upon either side of the resilient tang, that is, the tang is movable within a free space surrounded by means of the plate, both arms and the head.

Due to the provision of the head, the body is held without clearance within the opening while both arms provide for sufficient rigidity of the body and sufficient strength thereof and improve if need be the aforementioned guiding effect which postpones the time at which the tang comes into contact with the edges of the opening.

According to a preferred embodiment of the invention the insertion body comprises two similar resilient tangs which are offset from one another.

Thus, instead of being disposed one opposite to the other as in the case of the known snap-fastener and moving by coming closer to or being spaced apart from one another, both tangs lie adjacent to one another and move along parallel paths.

The space remaining for permitting the aforenoted movement is therefore not obstructed either by means of the presence of the arm or the presence of the other tang and both tangs can be advantageously configured and utilized, particularly in connection with the requisite insertion force.

According to preferred characteristics of this embodiment the tangs are disposed within the vicinity of a plane of symmetry of the body and are disposed in opposed relationship with respect to each other.

Therefore one can obtain a generally balanced effect favoring the functioning of the snap-fastener both during the insertion thereof and the maintenance of the same within the support panel or wall.

BRIEF DESCRIPTION OF THE DRAWINGS

Further characteristics and advantages of this invention will appear in the course of the following description of an exemplary embodiment given in an illustrative and not at all limitative manner with reference being made to the accompanying drawings in which like reference characters designate like or corresponding parts throughout the several views, and wherein.

DETAILED DESCRIPTION OF THE ILLUSTRATED EMBODIMENTS

Figure 1:
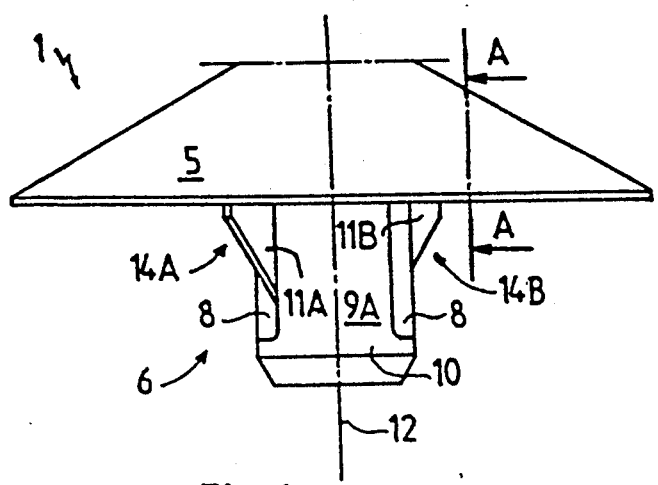
FIG. 1 is an elevational view of a snap-fastener constructed according to the invention.
Figure 2:
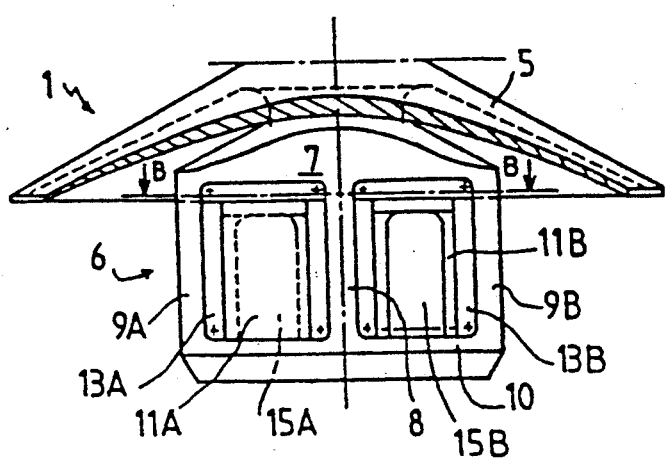
FIGS. 2, 3 and 4 are sectional views designated respectively as 2—2, 3—3, and 4—4 in FIGS. 1, 2 and 3.
Figures 3, 4:
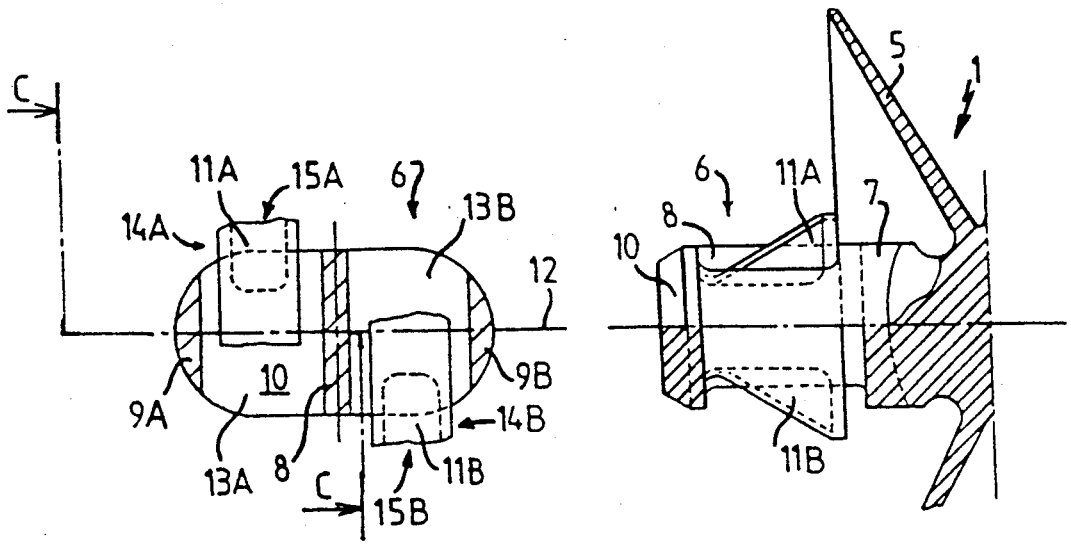
Figure 6:
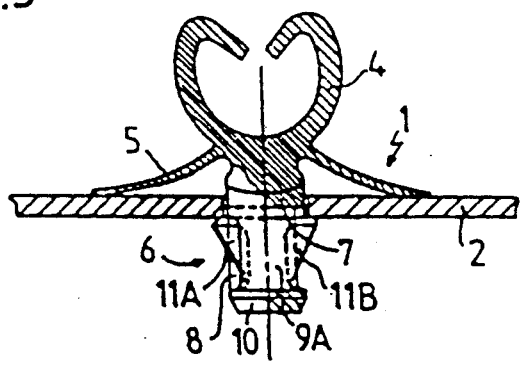
FIG. 6 is a sectional view of a cable clamp provided with the snap-fastener illustrated in FIGS. 1 to 4 and secured to a wall.
Figure 5:
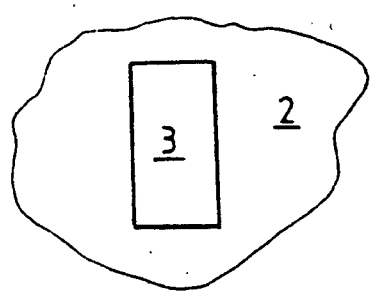
FIG. 5 shows a wall formed with an insertion opening therein into which the snap-fastener of FIGS. 1 to 4 is to be inserted.

The illustrated snap-fastener 1, comprised by an element of molded thermoplastic material, is to be mounted upon means of a wall such as, for example, the wall 2 of a car body as shown in FIGS. 5 and 6 which is formed with an opening 3 therein having a predetermined contour, the element to be fixed mounted being in this exemplary embodiment a cable clamp also comprising a collar 4 for holding the cable, to be connected to the snap-fastener 1, wherein the collar 4 is integrally formed with the fastener 1.

The snap-fastener comprises a cap 5 and a body 6 which is joined to the cap at the center thereof, upon the side thereof opposite that to which the collar 4 is connected.

The cap 5 is formed by means of an elastic convex wall of the suction cup type and is adapted to rest upon the insertion side of the wall 2 so as to provide a holding function with compensation for any clearance, and a sealing function.

The body 6 comprises a head 7 which is adapted to be disposed within the opening of the panel or wall at the end of the insertion operation, a central arm 8 and two lateral arms 9A, 9B, each being connected transversely to head 7, and an end plate 10 transversely connected to arms 8 and 9A, 9B and two similar offset resilient tangs 11A, 11B which are mounted in a cantilevered manner upon plate 10 within the vicinity of the plane of symmetry 12 and which are disposed in opposed relationship within the respective free spaces 13A or 13B delimited by means of plate 10, the central arm 8, the head 7 and the respective lateral arms 9A or 9B.

Plate 10 and arms 8, 9A and 9B are able to pass through or be disposed within the contour of opening 3 and the tangs 11A and 11B take the natural position shown, where they have their free ends 14A, 14B at least partly projecting outside of to the contour of the opening while being adapted to bend inwardly toward positions within the opening contour by moving parallel to arms 8, 9A or 9B so as to be entirely housed within space 13A or 13B, that is, so as to lie entirely within the contour of opening 3.

In order to mount the snap-fastener within a support panel, wall, or the like, as designated at 2 in FIG. 6, the fastener is introduced into the opening 3, with plate 10 inserted first, and the plate and arms 8, 9A and 9B guide the body 6 into the opening, the free ends 14A and 14B ultimately encountering the edges of opening 3 such that the tangs 11A and 11B retract into the spaces 13A and 13B and at the end of the insertion operation they return to their original positions at which the free ends 14A and 14B engage wall 2 whereby the snap-fastener is locked within panel or wall 2 through means of the conjugate effect of the cap 5 and the tangs 11A, 11B which respectively bear upon the opposite sides of the wall 2.

Although body 6 has little bulk it will be noted that tangs 11A, 11B have sufficient freedom of movement so that they can be disposed at a favorable inclination thereby providing for a lever arm sufficiently strong to permit them to bend; and yet the snap-fastener can be positioned within the wall or panel 2 by means of a very low force.

The disposition of the head 7 within the opening 3 enables the snap-fastener or panel 2 without any play or substantial looseness defined therebetween, the wall and the matching of the contour of the plate 10 and of the arms 8, 9A and 9B with respect to the contour of opening 3 produces guided movement for the fastener as the same is inserted within the opening 3 of the wall or panel member 2 whereby the tangs 11A and 11B easily come, into contact with the peripheral portions of the opening 3 only by means of their ends 14A and 14B with the available lever arm being sufficiently strong for permitting them to easily bend.

In this form of embodiment tangs 11A and 11B have a wedge shape and more precisely the shape of a right triangle joined by means of its apex to plate 10.

This wedge shape is advantageous since it provides for a large surface bordering the free end of the tang which comes into contact the wall 2, while providing a small cross-sectional area at the connection defined between the tang and the plate thereby permitting the tang to bend easily, since the connecting zone forms a hinge means.

However a different shape for the tangs can of course be selected in further forms the invention, depending upon the specific conditions or working parameters, and it is also possible to connect the tangs to the plate elsewhere than within the vicinity of the plane of symmetry.

In the embodiment illustrated in FIGS. 1 to 4 and 6, the surface bordering the free end of the tang which comes into contact with the wall 2, is disposed transverse to body 6 in the natural position adopted by means of the tang, and thus the snap-fastener is not readily removable from the wall or panel 2.

Figure 7:
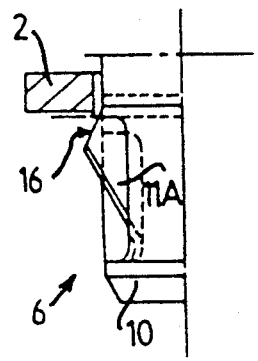
FIG. 7 is an enlarged partial cross-sectional view similar to a portion of FIG. 6 showing, however an alternative embodiment of the resilient tang.

In accordance with an alternative embodiment shown in FIG. 7, however, the corresponding surface 16 is inclined so as to extend from the radially outermost portion of the tang 11A, for example, radially inwardly toward the plane of symmetry 12 of the body, and away from the plate 10 so as to make the snap-fastener readily dismountable if it is pulled out with a sufficient force such the tang moves in and the body can be removed from the wall.

Each of the tang blades present presents a respective central recess therein 15A and 15B so as to facilitate the molding thereof.

The use of two tangs lying side by side which are hingedly connected about one and the same pivot plane permits one to obtain a balanced body both as regards the insertion and the holding characteristics of the fastener with respect to the panel or wall 2. However depending upon the circumstances one can use an alternative form of embodiment providing for a single resilient tang.

In the exemplary embodiment shown which comprises two tangs there are three arms to connect the plate to the remainder of the body in accordance with order to obtain good rigidity and high strength but in an alternative embodiment with two tangs it is possible, for example, to use only the central arm 8 and in accordance with an embodiment with one tang, to provide for only one arm.

Opening 3 into which body 6 is inserted is rectangular and tangs 11A and 11B have a freedom of movement oriented along the smaller dimension thereof but obviously the body of the snap-fastener according to the invention is suitable in specific forms for many other opening shapes and in particular for round and square shapes.

It will be understood that this invention is not limited to the forms of embodiment described and represented in the figures but that it encompasses any alternative embodiments that can be determined by a man skilled in the art. It is therefore to be understood that within the scope of the appended claims, the present invention may be practiced otherwise than as specifically described herein.

I claim:

1. A snap-fastener adapted to be fixedly mounted within a panel provided with an aperture having a predetermined configuration, comprising:

a body; and head means fixedly mounted upon one end of said body for engaging a first surface of said panel when said fastener body is inserted within said aperture of said panel;

said body further comprising an end plate axially spaced from said head means; a first lateral arm interconnecting first lateral side portions of said head means and said end plate; a second lateral arm interconnecting second lateral side portions of said head means and said end plate, said second lateral arm being laterally spaced from said first lateral arm; a central arm interposed between said first and second laterally spaced lateral arms and interconnecting central portions of said head means and said end plate such that a first chamber space is formed within said body by means of said end plate, said first lateral arm, said head means, and said central arm, and a second chamber space, separate from said first chamber space, is formed within said body by means of said end plate, said second lateral arm, said head means, and said central arm; a first tang pivotably mounted upon said end plate and within said first chamber space so as to be movable within a first plane between a first position at which a free end portion of said first tang projects outwardly from said first chamber space so as to engage a second surface of said panel when said fastener is fully inserted within said panel, and a second position at which said first tang, including said free end portion thereof, is fully retracted within said first chamber space as said fastener is being inserted within said panel; and a second tang pivotably mounted upon said end plate and within said second chamber space so as to be movable within a second plane, disposed parallel to said first plane, between a first position at which a free end portion of said second tang projects outwardly from said second chamber space so as to engage said second surface of said panel when said fastener is fully inserted within said panel, and a second position at which said second tang, including said free end portion thereof, is fully retracted within said first chamber space as said fastener is being inserted within said panel.

2. A snap-fastener as set forth in claim 1, wherein:

said first and second tangs are pivotably mounted upon said end plate such that said pivotable movements of said first and second tangs are within planes disposed parallel to said first and second lateral arms and said central arm.

3. A snap-fastener as set forth in claim 1, wherein:

said end plate, said first and second lateral arms, and said central arm, define a predetermined external configuration of said fastener body which substantially corresponds to said predetermined configuration of said panel aperture.

4. A snap-fastener as set forth in claim 1, wherein:

each of said first and second tangs has a substantially wedge-shaped configuration with one apex portion thereof fixedly secured to said end plate.

5. A snap-fastener as set forth in claim 1, further comprising:

a lateral axis defined within said fastener body and passing through central portions of said first and second lateral arms and said central arm; and said first and second tangs are pivotably mounted upon said end plate such that said first and second tangs move in opposite directions with respect to each other toward and away from said lateral axis as said first and second tangs move toward said second and first positions, respectively.

6. A snap-fastener as set forth in claim 1, further comprising:

a longitudinal axis defined within said snap-fastener and extending through said fastener body and said head means; and said free end portions of said tangs are disposed substantially perpendicular to said longitudinal axis of said fastener and parallel to said second surface of said panel.

7. A snap-fastener as set forth in claim 1, further comprising:

a longitudinal axis defined within said snap-fastener extending through said fastener body and said head means; and said free end portions of said first and second tangs are disposed at a predetermined acute angle with respect to said longitudinal axis of said fastener so as to facilitate dismounting of said fastener from said panel.

8. A snap-fastener as set forth in claim 5, wherein:

each of said first and second tangs has a substantially wedge-shaped configuration with one apex portion thereof fixedly secured to said end plate upon said lateral axis of said fastener body.

9. A snap-fastener as set forth in claim 1, wherein said head means comprises:

a resilient cup-type convex cap for engaging said first surface of said panel.

10. A snap-fastener as set forth in claim 9, further comprising:

cable clamp means integrally formed with said cup-type cap for holding a cable to be fixedly mounted upon said panel.

11. A snap-fastener as set forth in claim 1, further comprising:

cable clamp means integrally formed with said head means of said fastener for holding a cable to be fixedly mounted upon said panel.

* * * * *